United States Patent
Tsai et al.

(10) Patent No.: US 6,653,003 B1
(45) Date of Patent: Nov. 25, 2003

(54) FUEL CELL SUPPORT AND ELECTRICAL INTERCONNECTOR

(75) Inventors: Tsepin Tsai, Chappaqua, NY (US); Wayne Yao, Saddle Brook, NJ (US); Lin-Feng Li, Croton-on Hudson, NY (US); George Tzeng, Elmsford, NY (US); Michael Rabin, Tarrytown, NY (US); William Morris, Stonington, CT (US); Sadeg M. Faris, Elmsford, NY (US)

(73) Assignee: Reveo Inc., Elmsford, NY (US)

( * ) Notice: Subject to any disclaimer, the term of this patent is extended or adjusted under 35 U.S.C. 154(b) by 0 days.

(21) Appl. No.: 09/416,554

(22) Filed: Oct. 12, 1999

(51) Int. Cl.⁷ ............................................... H01M 8/04
(52) U.S. Cl. ............................ 429/17; 429/9; 429/18; 429/27; 429/123; 429/152
(58) Field of Search ................................ 429/9, 18, 27, 429/123, 152

(56) References Cited

U.S. PATENT DOCUMENTS

| | | |
|---|---|---|
| 3,844,841 A | 10/1974 | Baker |
| 4,756,980 A | 7/1988 | Niksa |
| 4,950,561 A | 8/1990 | Niksa |
| 5,011,747 A * | 4/1991 | Strong et al. ............... 429/27 |
| 5,156,925 A * | 10/1992 | Lapp ......................... 429/19 |
| 5,415,949 A | 5/1995 | Stone |
| 5,447,805 A | 9/1995 | Harats |
| 5,458,988 A | 10/1995 | Putt |
| 5,599,637 A | 2/1997 | Pecherer |
| 5,650,241 A * | 7/1997 | McGee ....................... 429/67 |
| 5,741,605 A | 4/1998 | Gillett |

OTHER PUBLICATIONS

Webster's II New Riverside University Dictionary, p. 116.*

* cited by examiner

*Primary Examiner*—Carol Chaney
*Assistant Examiner*—Dah-Wei Yuan
(74) *Attorney, Agent, or Firm*—Ralph J. Crispino; Israel Nissenbaum

(57) ABSTRACT

Flat plate fuel cells, particularly air-depolarized cells, are stacked and electrically interconnected into a battery structure with a connector block and tray. The anode and cathode elements of each cell are provided with extending terminal conductor elements (e.g., banana plugs), preferably extending in downward "U" shaped configuration from the upper ends of the anode and cathode elements respectively. The connector block comprises a series of conductive apertures, positioned and sized to accommodate the terminal conductor elements of the electrodes therein and the connector block comprises electrical interconductive elements to electrically connect- the electrodes of the stacked cells in a desired electrical interconnection (serial, parallel and mixed serial and parallel segments). The interconnection between terminal conductor elements and the respective apertures further serves to support and orient the cells in a minimal volume and permits selective rapid cell removal for replacement or servicing. The cells are also provided with keyed members for keyed interlocking with a support tray having co-fitting keying elements to provide full structural integrity for the stacked cells. Lateral end elements extend between the connector block and support tray to complete an open enclosure and provide a support base for air circulating devices such as fans. Air is circulated through a duct defined by the block and between the fuel cells.

15 Claims, 9 Drawing Sheets

FUEL CELL SUPPORT AND ELECTRICAL INTERCONNECTOR

FIELD OF THE INVENTION

This invention relates to stacked fuel cell structures with cell support elements and electrical interconnectors and particularly to such support elements and interconnectors for air-depolarized cells which require electrode material and electrolyte maintenance.

BACKGROUND OF THE INVENTION

Fuel cells of individual cells, particularly of flat plate configuration, are often arranged in blocks or stack structures of electrically interconnected cells, into batteries of desired power. In the past, various means have been used for holding the cells in position relative to each other and for electrically interconnecting the cells. Often these means are unrelated and accordingly there is a substantial volumetric loss, excessive complication of elements and overall weight, as well as difficulty in removing and servicing the individual cells. In addition, both fuel cell battery holding structures are of an enclosure type and the electrical connective elements tend to render enclosed cells difficult to access, replace, or service. For fuel cells, ease of service is of particular importance because of the need for replacing depleted materials, particularly electrolyte in air-depolarized cells, as well as anode material exchange to facilitate quick zinc fuel exchanging (i.e., "mechanical recharging") in air depolarized cells.

SUMMARY OF THE INVENTION

It is accordingly an object of the present invention to provide a structure for fuel cells for construction into a modular battery structure with integrated fuel cell stacking and support means and electrical interconnection means.

It is a further object of the present invention to provide such battery structure which permits quick removal and interconnection of fuel cell elements for service and replacement (in particular, mechanical recharging of anode materials).

It is yet another object of the present invention to provide a battery structure which includes means for air circulation for use with air depolarized fuel cells.

Generally the present invention comprises a fuel cell battery structure comprising at least two fuel cells and an electrical connector block. The fuel cells are electrically interconnected into a battery structure via the connector block. Each fuel cell comprises an anode and cathode element and each of the anode and cathode elements of each cell are provided with a terminal conductor element externally positioned on one side of the respective fuel cells. The connector block comprises a series of conductive elements adapted for electrical and mechanical engagement with the respective terminal conductor elements of the anode and cathode elements of each of the fuel cells on said one side of the respective fuel cells. The connector block further comprises means for electrically connecting the anodes and cathodes of the stacked cells into a desired electrical interconnection. In addition, the block mechanically holds the respective fuel cells on one side of the block, in a fixed position as a result of the mechanical engagement. As a result, another side of each of the fuel cells remains exposed to permit disengagement and removal of the fuel cells from the block.

Generally the present invention comprises means for forming a stack of fuel cells into a unique overall fuel cell (in particular air depolarized cells such as zinc/air cells) or battery structure, wherein a single structural element provides means for cell support and stacking and electrical interconnection of the cells into a desired electrical configuration. In addition, the structural element is preferably configured with air duct means to facilitate air circulation to the individual cells, with concomitant increase in discharge rate capability.

In accordance with the present invention, flat plate fuel cells and batteries of cells, particularly air-depolarized cells, are stacked and electrically interconnected into a battery structure with a connector block and optional support tray. The anode and cathode elements of each cell are provided with extending terminal conductor elements, preferably extending in downward "U" shaped configuration from the upper ends of the anode and cathode elements respectively, to provide maximum physical support. However, other extension configurations (e.g., upwardly extending, laterally extending, etc., as well as reversal of the male and female elements) are similarly operable and are included in the present invention.

In a preferred embodiment the connector block comprises a series of conductive apertures, positioned and sized to accommodate the terminal conductor elements of the electrodes therein. The connector block further comprises electrical interconnecting elements to electrically connect the electrodes of the stacked cells in a desired electrical interconnection (serial, parallel and mixed serial and parallel segments). Available, electrically mating male and female plug connections such as banana plugs are preferably used in conjunction with the electrode collectors of the cells and imbedded in the block, to effect both the electrical interconnection and mechanical support between the cells and the connector block. The interconnection between terminal conductor elements and the respective apertures further serves to support and orient the cells in a minimal volume and permits selective rapid cell removal for replacement or servicing and "mechanical recharging". The cells are also preferably provided with keyed members for keyed interlocking with a support tray having co-fitting keying elements to provide full structural integrity for the stacked cells. Lateral end elements extend between the connector block and support tray to complete an open enclosure and provide a support base for air circulating devices, such as fans, in an "air management system" and also support the block in a suspended position suitable for engagement with the individual fuel cells.

Other objects, features and advantages of the present invention will become more evident from the following discussion and drawings in which:

SHORT DESCRIPTION OF THE DRAWINGS

FIG. 8b is a sectioned side view of a bus bar as used in FIG. 8a; and

DETAILED DESCRIPTION OF THE INVENTION

Figure 1:
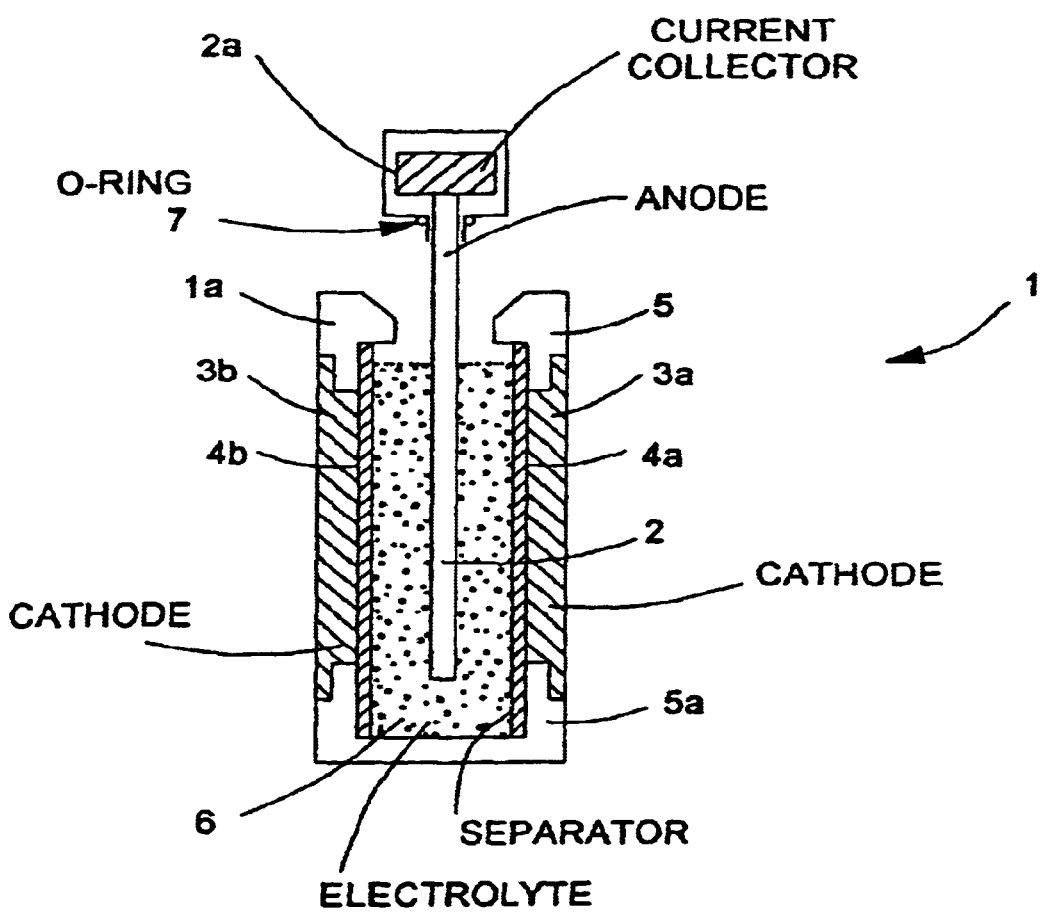
FIG. 1 is a schematic cross section of a zinc/air depolarized fuel cell used with the present invention.

The connective support block with direct electrode connections provides a means for high current system designs (e.g. in excess of 25A in a typical structure) by shortening the current collection path with reduction of losses. The connector blocks are preferably adapted to be engaged at one side of the fuel cells thereby leaving the other side of the fuel cells open, for ready removal of cells for exchange or maintenance. This also permits mechanical recharging of the anode by the simple and reliable replacement of the anode elements of the single cells as such cells are individually removed.

The connector block is preferably comprised of an insulative material such as structurally strong engineering plastic (whereby conductive connectors or buses are used to selectively make the appropriate circuit) and is preferably in an elongated laterally stepped structure configuration with a central raised section and peripheral lower sections (for fuel cells of the same dimension it is preferred that the outer sections be on a single plane). In a preferred embodiment, the central section is provided with two rows of apertures to accommodate anode connectors from cells positioned on either side of the elongated block, and the outer lower sections are provided with single rows of apertures to accommodate connectors from the cathodes of the adjacent cells (it is of course understood that the anode and cathode connections with the block can be reversed without departing from the scope of the invention). All the anode connectors should be aligned with each other and all the cathode connectors should be aligned with each other; with the respective anode and cathode connectors being offset from each other (differing height relative to the cells and differing extending length (relative to the block) whereby proper connection of anodes and cathodes with the block is assured.

The connector block longitudinally extends for a length at least sufficient to laterally engage the desired number of fuel cells. The height of the block is preferably minimized to be sufficient to mechanically buttress the adjacently held fuel cells while not overly blocking intercell areas whereby air circulation is not hindered thereby.

In a preferred embodiment, extending current rods extending along the width of the anode and the length of the cathode are electrically engaged (such as by a conductive threaded engagement) with the respective banana plug extensions. The female conductive sockets are imbedded within the connector block and comprise conductive elements which extend to the underside of the block (distal to the engagement with the cells) for selective electrical interconnection. The block itself is provided with end support members to maintain it in the elevated position for engagement with the collector plugs of the cell electrodes. In a preferred embodiment, the end support members are integrated with fans aligned with the longitudinal spacing between the laterally positioned cells which functions as a central air duct for forced guiding of air to the air depolarized cells and then outwardly across the width of the cells. As a result, air is efficiently provided to the individual cells for the air depolarization thereof with high rate capability.

A bottom tray serves to prevent skewing of the cells if they are moved and to ensure proper placement with keyed element engagement between elements of the cells and the tray. The downward U-shaped engagement is preferred in this regard since it readily permits upward disengagement with both the block and the tray in a single motion.

The individual fuel cells such as zinc/air fuel cells are comprised of a central plate anode between outer carbon or conductive powder cathodes and separated therefrom by separators. The electrolyte is generally a potassium or sodium hydroxide solution and its level is readily monitored by a visual check through end windows in the cells which remain visible even when the cells are arranged in a battery stack.

DETAILED DESCRIPTION OF THE DRAWINGS AND THE PREFERRED EMBODIMENT

Figure 2:
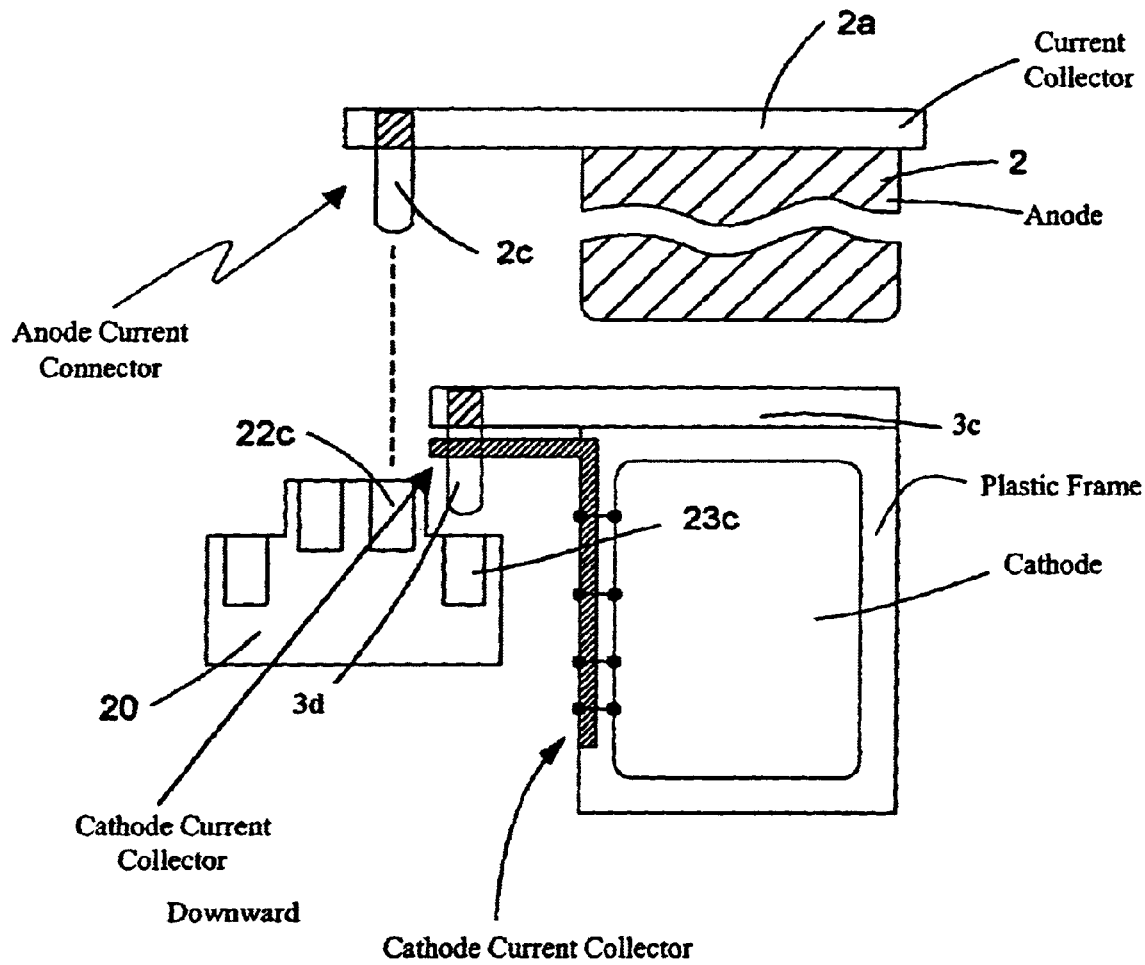
FIG. 2 is an exploded side view of the cell of FIG. 1 shown with respective anode and cathode current collectors and external connective elements relative to a supportive connective block.
Figure 3:
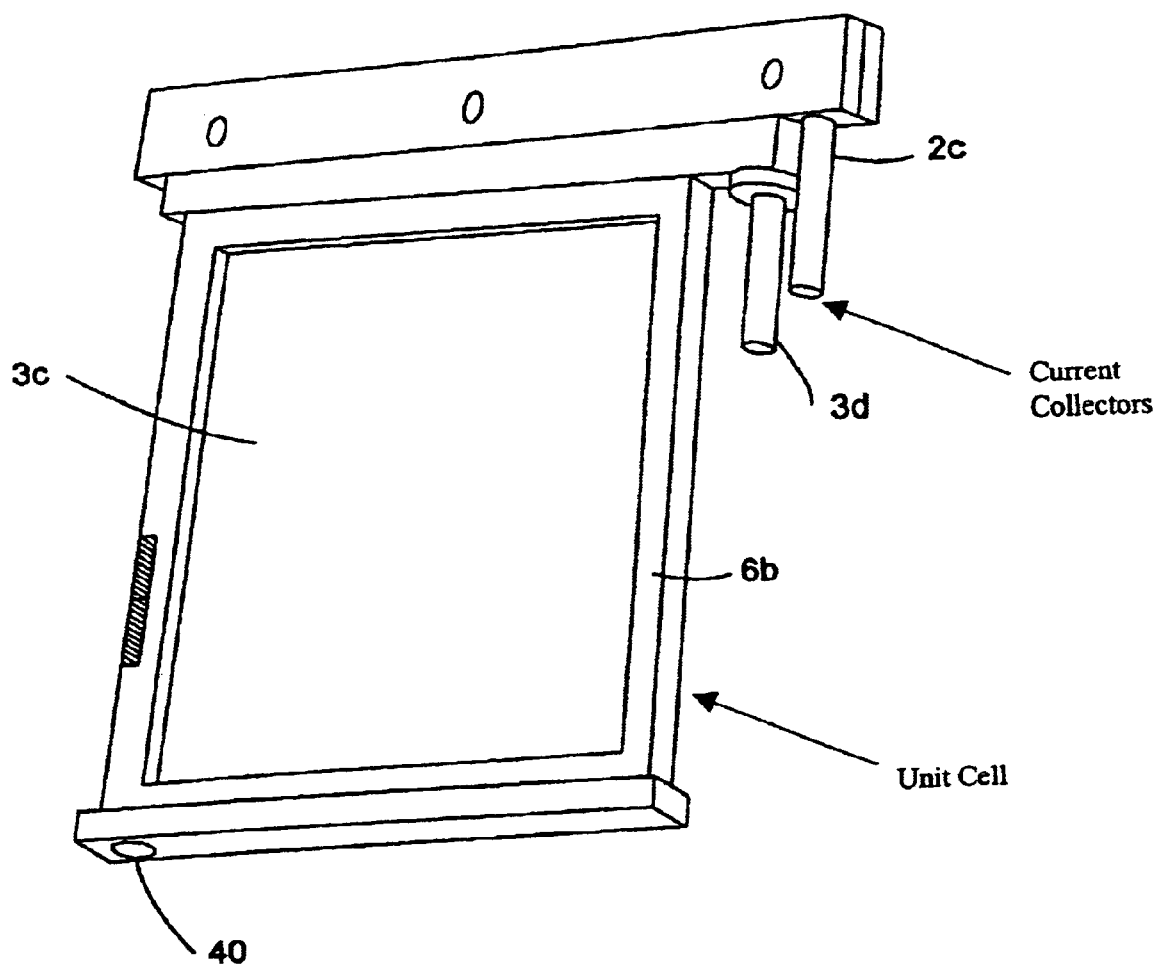
FIG. 3 is an isometric view of the cell of FIG. 1 and 2 showing the relative positions of anode and cathode extending connector elements.

With specific reference to the drawings in FIG. 1 a zinc/air depolarized cell 1 is shown with a central zinc anode plate 2 and anode current collector 2a. The anode is positioned between cathode plates 3a and 3b and separated therefrom by separators 4a and 4b. As shown, the cathode elements serve as the side walls of the fuel cell (since the cell shown is an air depolarized cell, there are little configurational changes associated with the cathode structure, whereby integrity of the walls is maintained) within a supporting frame 5, with end closure 5a, to effectively form cell container 1a. The anode 2 and electrolyte 6 are fully contained within the enclosure so formed. Anode current collector 2a extends through sealing O-ring 7. As more clearly seen in FIG. 2, the anode current collector extends across the upper width of the anode 2 and terminates in downwardly extending conductive plug 2c for insertion into mating plug aperture 22c in the center of connector block 20. As shown in FIGS. 2 and 3, cathode current collector 3c, extends along an outer longitudinal edge of the cell and electrically engages downwardly extending conductive plug 3d for insertion into mating plug aperture 23c in the outer peripheral edge of connector block 20. Extending nonconductive cap element 3e supports cathode conductive plug 3d and insulatively separates the respective anode and cathode collectors.

Figure 4:
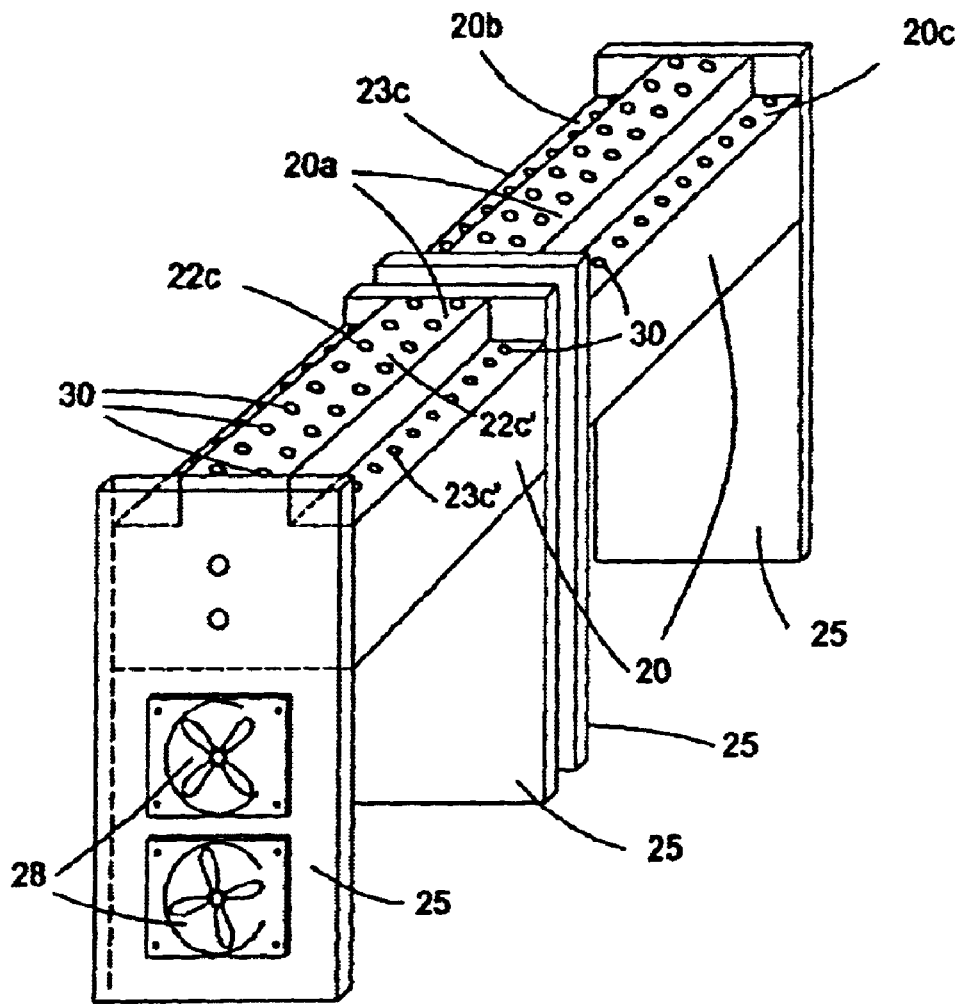
FIG. 4 is an isometric view of two connector blocks of the present invention adjacently aligned, with supporting end elements having air circulation fans.
Figure 5:
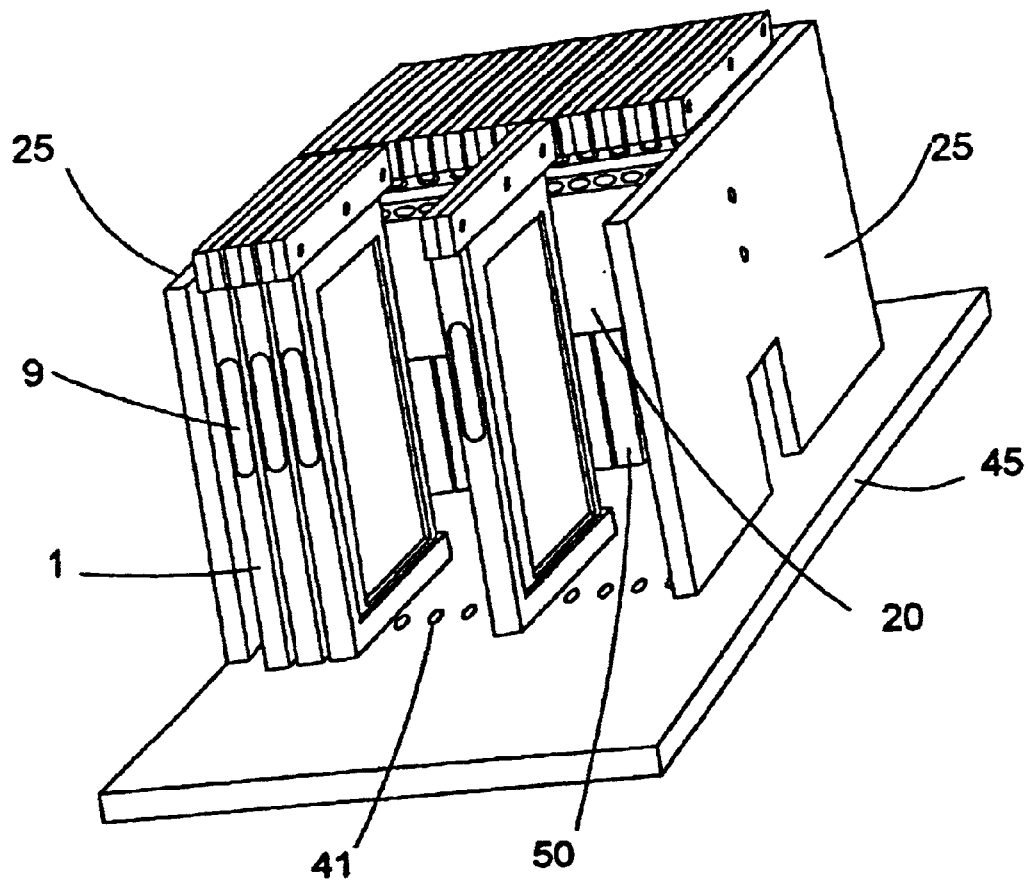
FIG. 5 is an isometric view of fuel cells stacked on a connector block and positioning tray.

FIG. 4 depicts two abutted conductor blocks 20 with central raised section 20a and outer peripheral ledges 20b and 20c. The apertures in the two rows of apertures 22c and 22c' in raised section 20a contain female plugs 30 which electrically engage the anode collector plugs 2c of cells positioned, as shown in FIG. 5 on both lateral sides of block 20. At the same time female plugs 30 in apertures 23c in outer peripheral ledges 20b and 20c engage cathode collector plugs 3d of the laterally positioned cells.

As shown in FIG. 3, each fuel cell 1 is provided with key aperture 40, which, as shown in FIG. 5, is adapted to engage keyed protrusion 41 in supporting battery tray 45. As a result, each fuel cell 1 is held on three side, on the upper end by engagement of the block 20 with the respective electrode plug connectors, with a buttress against the inner edges of the cells between the block 20 and the cathode current collector and by the keyed connection at the base. All three connections are readily disengaged by a lifting of the individual cells off the connector block.

Figure 6:
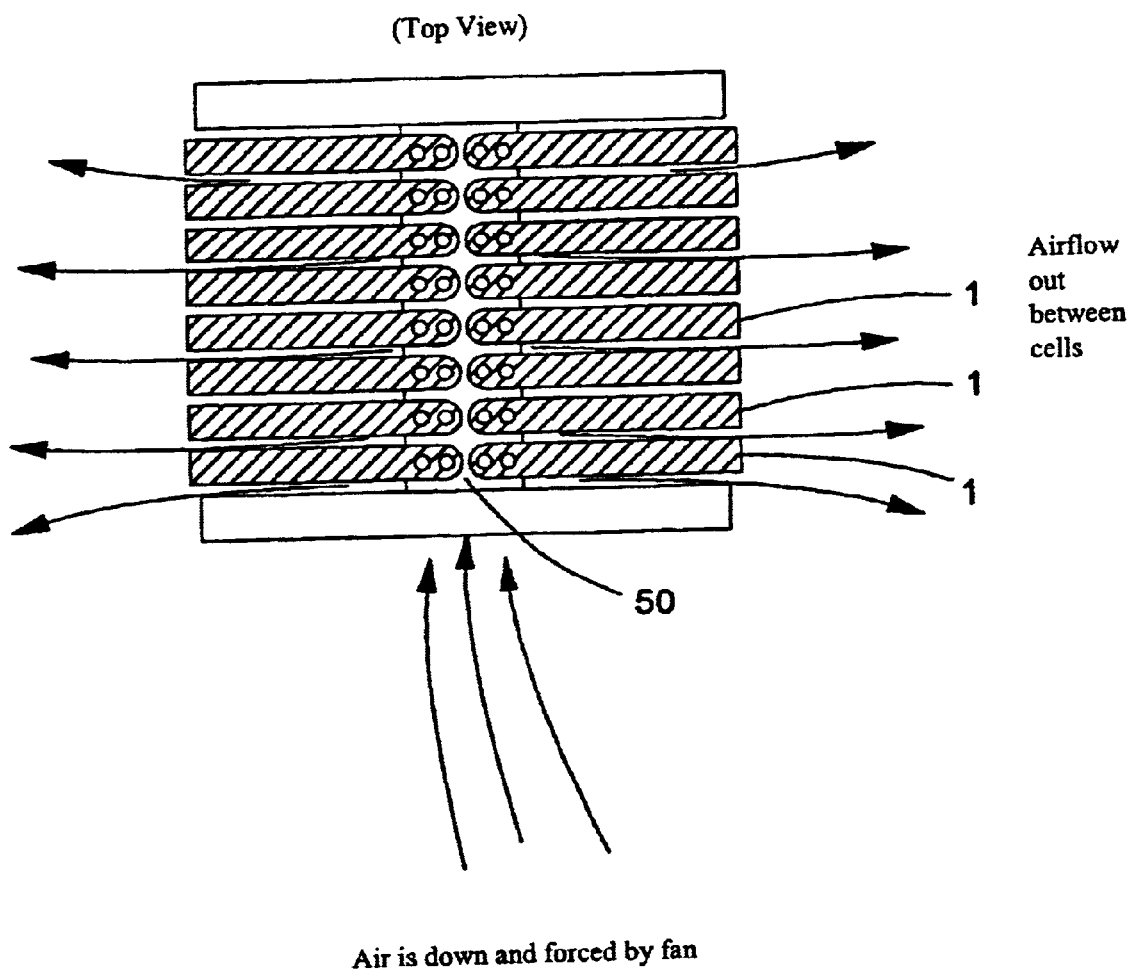
FIG. 6 is a schematic top view of the fuel cells of FIG. 5 in a completed stack, showing air flow direction.

As shown in FIG. 4, end support members 25 are integrated with the ends of the block such as with a bolted connection and such support members maintain the block in the elevated position for engagement with the respective fuel cells. In addition, as shown in FIG. 4, the support members contain fans 28 (powered, by the cells themselves or from an external source) which force air against all the respective cell cathodes as shown in FIG. 6 via the arrows which indicate air flow direction. As seen in FIG. 5, engagement between the fuel cells 1 and the block 20 forms a central open air duct 50 beneath the block 20 which is closed at both ends by the support member 25. As a result, blown air is forced out laterally between the fuel cells and against the cathode elements for maximized air contact and depolarization.

As also shown in FIG. 5, each fuel cell 1 is provided with a window 9 at the appropriate electrolyte level whereby decrease in electrolyte level is readily apparent.

Figure 7:
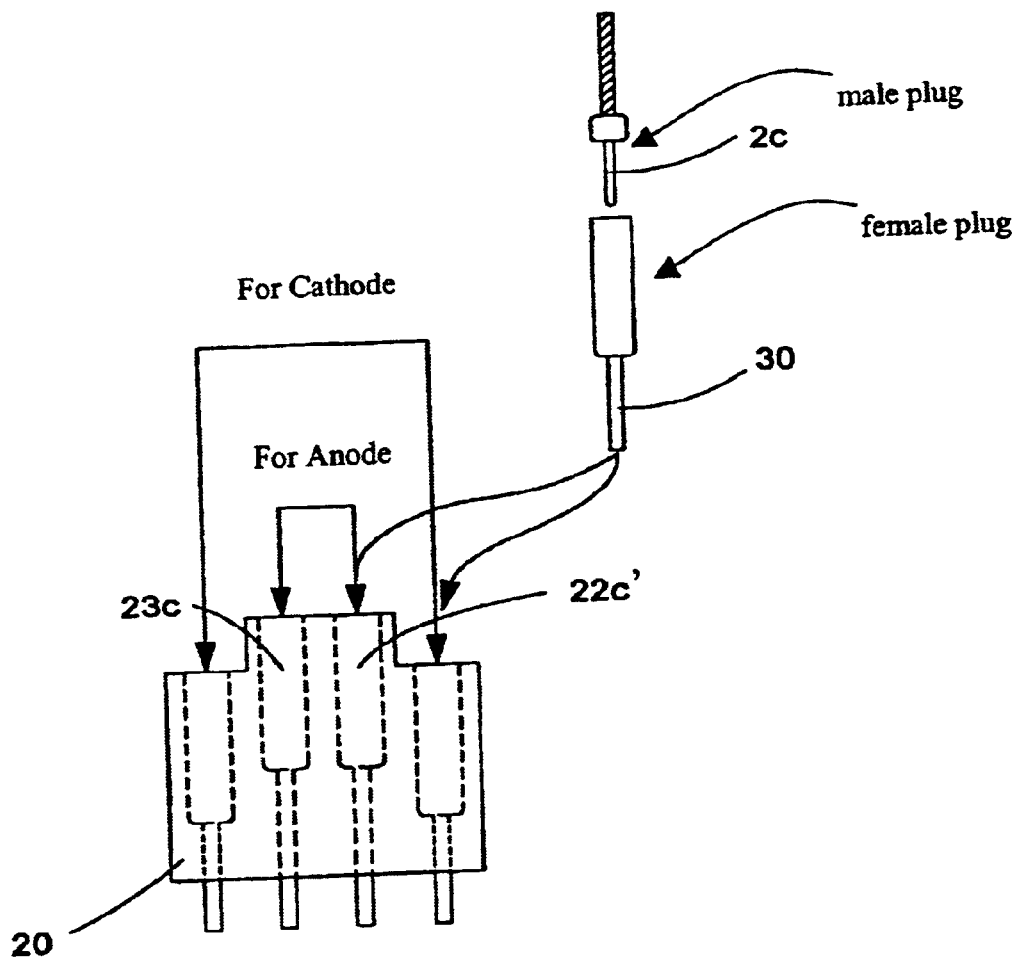
FIG. 7 is a cross section of the connector block with male and female banana plug connection elements.
Figure 8B:
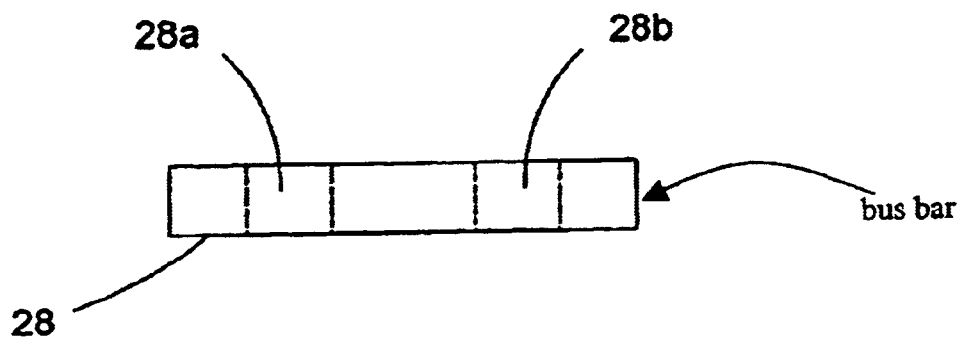
Figure 8A:
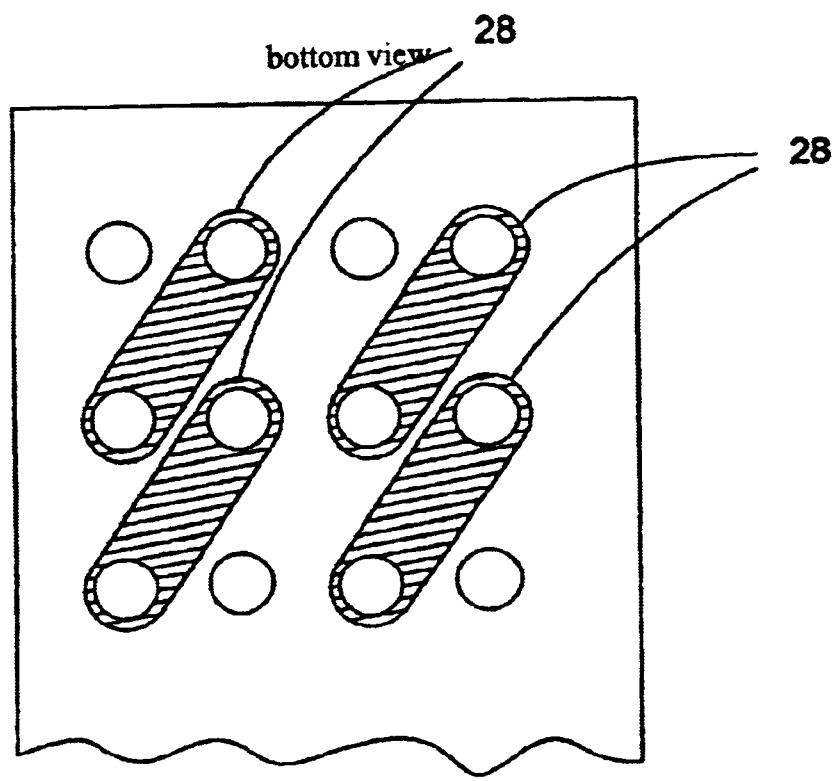
FIG. 8a is a bottom view of bus bars showing connections of successive cell anodes and cathodes in a serial cell connection arrangement.

As seen in FIG. 7, block 20 is cored with through holes 22c and 23c into which female banana plugs 30 are seated. The female plugs have a receptacle core for engagement with the mating plugs 2c and 3d of the electrodes. In addition, the female plugs have conductive ends (as shown, such ends are threaded), for external engagement, at the bottom of the block, with interconnector elements 28. In FIG. 8a, a portion of the underside of block 20 is shown with interconnector elements 28 providing successive connection engagement of anodes and cathode elements of adjacent cells in a serial connection. As further shown in FIG. 8b the interconnector elements 28 are bus bars with two apertures 28a and 28b for engagement with the extending ends of the female plugs in block 20.

Figure 9A:
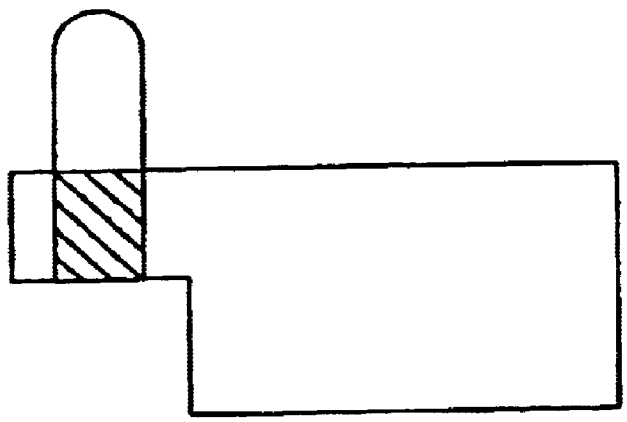
FIGS. 9a and 9b depict alternative configurational extensions of the connection elements of the electrodes.
Figure 9B:
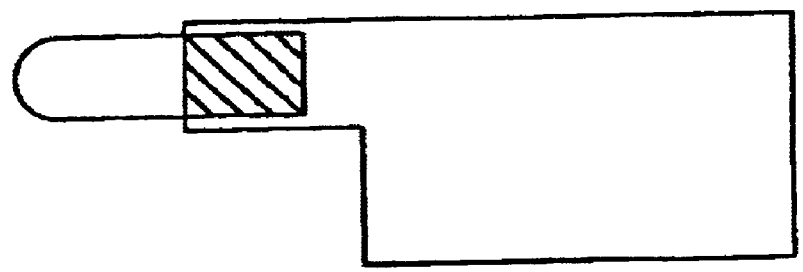

In other embodiments, as shown in FIGS. 9a and 9b, the electrode plug elements are shown to extend upwardly and laterally respectively. In such embodiments, the connector block (not shown) is correspondingly apertured. Similarly, the male and female plugs may be reversed, though with some complication is connecting structure.

It is understood that the above embodiment and discussion are illustrative of the present invention and descriptions therein are not be construed as limitations on the present invention. It is understood that changes in components, structures, materials, cell types and the like may be made without departing from the scope of the present invention as defined in the following claims.

What is claimed is:

1. A fuel cell battery structure comprising
   at least two fuel cells and an electrical connector block, with said fuel cells being electrically interconnected into a battery structure via said connector block,
   wherein each cell comprises an anode and cathode element and,
   wherein said block is elongated along a longitudinal axis and said cells are axially engaged with said block;
   wherein said block comprises at least two rows of apertures extending along said axis;
   wherein each of the anode and cathode elements of each cells are provided with a terminal conductor element positioned on one side of the respective fuel cells:
   means for electrically connecting the anodes and cathodes of the stacked cells into an electrical interconnection selected from the group consisting of series electrical interconnection parallel electrical interconnection and mixed series and parallel electrical interconnection and with each of the fuel cells on said one side of the respective fuel cells;
   wherein said terminal conductor elements of said anodes and cathodes extend away from the respective cells and are adapted to be respectively inserted and engaged with said apertures, wherein the terminal conductor elements of said anodes, when said cells are aligned, are offset from the terminal conductor elements of the cathodes, wherein the terminal conductor elements of the anodes are engaged with apertures in one of said rows and the terminal conductor elements of the cathodes are engaged with apertures of the other of said rows:
   wherein the connector block further comprises circuit connection means for electrically connecting the terminal conductor elements of anodes and cathodes of the stacked cells into an electrical interconnection selected from the group consisting of series electrical interconnection, parallel electrical interconnection and mixed series and parallel electrical interconnection and
   wherein said block mechanically holds the respective fuel cells on the block, in a fixed position as a result of said mechanical engagement, and
   wherein another side of each of the fuel cells remains exposed to permit disengagement and removal of the fuel cells from the block.

2. The fuel cell battery of claim 1, wherein the terminal conductor elements of the anodes and cathodes are configured in downwardly extending U-shaped configurations and said apertures in said block are positioned in an upper surface thereof, whereby the individual fuel cells are mechanically fixed against the block with engagement of the terminal conductor elements and the apertures of said block.

3. The fuel cell battery of claim 1, wherein said block comprises two pairs of rows of apertures adapted for engagement with the anode and cathode terminal conductor elements of at least two fuel cells laterally positioned against two lateral sides of said block.

4. The fuel cell battery of claim 3 wherein the fuel cells are air depolarized and wherein a spacing for air ingress is provided between adjacent cells on each side of said block.

5. The fuel cell battery of claim 4 wherein the block and the ends of the cells, adjacent the block, define an air duct for channeling of air to said cells for the depolarization thereof.

6. The fuel cell battery of claim 5, wherein said block is supported by support means to thereby provide an open area beneath said block as part of said air duct.

7. The fuel cell battery of claim 6, wherein said support means further support air movement control means for providing and moving air within said air duct to said cells.

8. The fuel cell battery of claim 7, wherein said air movement control means comprises at least one fan attached to at least one of said block support means.

9. The fuel cell battery of claim 7, wherein said block comprises a solid rectangular configuration with lateral flange ledges wherein each of said ledges comprises one of said rows of apertures on an upper surface thereof and wherein an upper surface of the solid rectangle comprises a pair of rows, wherein the apertures in said ledges are adapted to be engaged with terminal conductor elements of one of the anode and cathode of the cells respectively adjacent thereto, and wherein the apertures in the pair of rows of the solid rectangle are adapted to be engaged with the terminal conductor elements of the other of said anode and cathode of the cells respectively adjacent thereto.

10. The fuel cell battery of claim 9, wherein the battery further comprises a support tray, with said fuel cells, engaged with said block being further supported by said tray and wherein said tray and said fuel cells comprising co-fitting key elements to help maintain said fuel cells in position relative to said block.

11. The fuel cell battery of claim 9, wherein the terminal conductor elements of the anodes and cathodes are configured in downwardly extending U-shaped configurations, whereby the individual fuel cells are mechanically fixed against the block with engagement of the terminal conductor elements and the apertures of said blocks.

12. The fuel cell battery of claim 9, wherein said apertures are through apertures, and said block is comprised of an electrically insulative material; wherein the means for electrically connecting the anodes and cathodes of the stacked cells into an electrical interconnection selected from the group consisting of series electrical interconnection, parallel electrical interconnection and mixed series and parallel electrical interconnection comprises electrically conductive receptacle elements disposed within each of said apertures for engagement with said terminal conductor elements and for selective electrical interconnection into an electrical arrangement selected from the group consisting of series electrical interconnection, parallel electrical interconnection and mixed series and parallel electrical interconnection of said fuel cells.

13. The fuel cell battery of claim 12, wherein said receptacle elements each comprise a conductive member which extends from the respective through apertures and which conductive members are engaged by electrically conductive bus bar members to effect said electrical interconnection.

14. A method for maintaining fuel cells in operative condition during the use thereof in a battery structure, comprising the steps of:

a) arranging said cells into the battery structure of claim 1, b) disengagingly removing any cell requiring mechanical recharging of any of said anode and electrolyte from said block, c) effecting replacement or addition or anode and electrolyte as required, and d) re-engaging said cell with said block.

15. A fuel cell adapted for use in the battery structure of claim 1, comprising a flat plate structure configuration comprised of a replaceable zinc anode plate disposed between two air depolarizing cathode plates and separated therefrom by separator means, wherein the cathode plates are peripherally held in a sealed frame structure whereby a surface of each said cathodes is externally exposed for contact with depolarizing air; said cell further comprising an anode current collector extending along an edge of said anode and terminating in a terminal conductor element which extends externally on one side of said cell and wherein said cell comprises a cathode current collector electrically engaged with said cathode plates which terminates in a terminal conductor element which extends externally on said one side of said cell.

* * * * *